July 19, 1932.                 C. H. PARSONS                     1,868,336
                                EGG SEPARATOR
                             Filed Sept. 10, 1930

Clinton Henry Parsons,
INVENTOR

Witness-

Patented July 19, 1932

1,868,336

UNITED STATES PATENT OFFICE

CLINTON HENRY PARSONS, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

EGG SEPARATOR

Application filed September 10, 1930. Serial No. 480,861.

My invention relates to a device designed for use with egg separators to prevent the passage of egg shells and other foreign matter into the usual receptacle for the egg whites.

One object of my invention is to produce a device to practically eliminate any possibility of foreign material, such as egg shells or portions of yolk passing along with the fluid egg albumen to the storage or shipping receptacle. Another object of the invention is to provide a device which will enable the operator to prevent the passage of such foreign material into such receptacle by giving the operator an opportunity to remove such foreign material before the egg white passes into the receptacle. A still further object of my invention is to provide a method for handling egg whites such that no foreign material will be delivered into the storage or shipping egg white container.

Referring now to the drawing.

Figure 1:
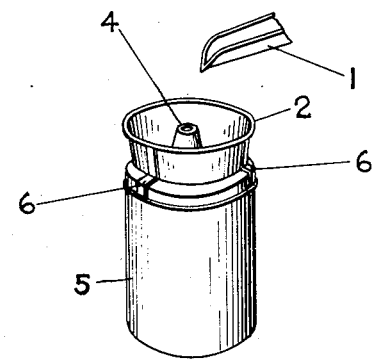
Figure 1 is a perspective view showing the trap placed in position upon the egg white receptacle.

No. 1 is an inclined trough down which egg whites pass in coming from egg separator. The egg whites passing down this inclined trough fall into the trap 2, which fills up with the fluid egg white. Egg shells and other foreign material having a greater specific gravity than the egg whites fall to the bottom as at 3. As the quantity of egg whites fills up the trap it reaches to level of the top of center spout 4 and passes thru center spout 4 into the receptacle 5. The flow is not rapid, and consequently, the operator has sufficient opportunity to remove such foreign material as egg yolk which may come down trough 1 with the egg whites. Trap 2 is provided with a plurality of members 6 which may be adjustable to hold the trap in position over receptacle 5.

Previous to my invention, it has been the practice in the industry to deposit egg whites in small containers to permit settling of foreign material, such as egg shells. The contents of these containers was then carefully poured off so as not to disturb any sediment which may have collected at the bottom thereof through action of gravity. The construction of the gravity trap eliminates the necessity for this extra handling, resulting in an appreciable saving in labor and greater sanitation in handling food product, which, of course, is a matter of considerable importance.

Figures 2, 3:
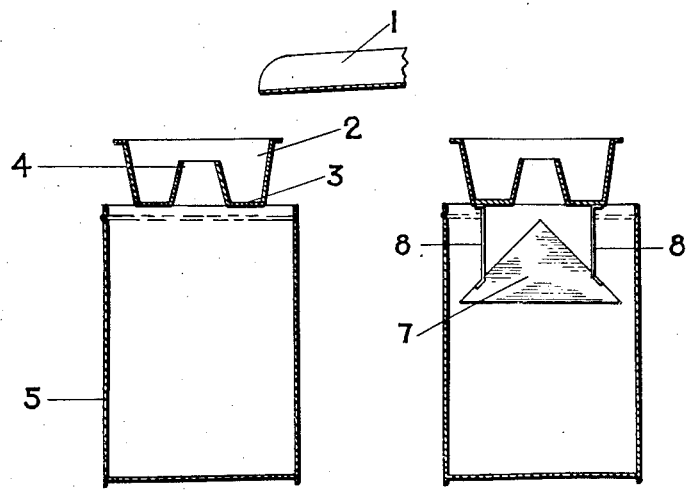
Figure 2 is a cross-section through the center spout of the trap. For convenience in describing the drawing, I use the same numbers to refer to identical parts in each of the figures.
Figure 3 is a vertical central section through a modified form of the apparatus.

In the drawing, I have shown a very simple cylindrical trap having a central down spout. For certain purposes, a cylindrical trap has advantages. This is especially true where it is used in combination with a cylindrical storage container for the whites, since it acts as a complete cover of the proper shape for such storage container in which the egg whites are deposited as they come from the trap. A cylindrical trap also presents fewer obstacles to thorough cleaning than the rectangular trap. However, it is clear that a rectangular trap or a trap shaped other than cylindrically would operate satisfactorily under certain conditions. The gravity trap of the general type shown in the drawing has used a central down spout which has advantages in permitting easy cleaning and handling of the products. It is simpler and cheaper to manufacture, and due to the ease with which they can be nested together such products may be more economically stored. However, at times it becomes advantageous to use a trap provided with a down spout so arranged as to direct the falling egg whites against the side of the storage container, eliminating splashing and the production of foam. If desired to direct the falling egg whites against the side of the storage container where a central down spout trap is being used, the trap should be used in connection with a baffle plate, which may be conical, so disposed in relation to the trap and storage container as to direct the falling egg whites against the side of the storage container, as shown in Figure 3, in which 6 has a conical baffle plate 7, attached to the trap 2, by rods 8.

It is understood that changes may be made in the design or manner of using a trap of the class described, or that other than down spout traps may be utilized without departing from the spirit of my invention as defined in the following claim.

I claim:

In combination, a receptacle, a second receptacle removably mounted on the first mentioned receptacle, the latter being relatively shallow and having an opening in its bottom, an imperforate spout confined wholly within the second mentioned receptacle and being disposed over said opening to provide a passage from the second mentioned receptacle into the first mentioned receptacle and so as to convey the lighter specific gravities through the spout into the first mentioned receptacle and to permit collection of the heavier specific gravities in the second mentioned receptacle between the spout and the side walls of the second mentioned receptacle, and a baffle plate suspended from the second mentioned receptacle and located within the first mentioned receptacle and being of conical shape to cause the separated lighter specific gravities to strike the sides of the first mentioned receptacle while passing therein.

Signed at Chicago, Illinois, this 8 day of September, A. D. 1930.

CLINTON HENRY PARSONS.